US008378250B2

(12) United States Patent
Flaig et al.

(10) Patent No.: US 8,378,250 B2
(45) Date of Patent: Feb. 19, 2013

(54) BEVEL HEAD ATTACHMENT FOR PLASMA AND OXY FUEL CUTTING MACHINES

(75) Inventors: Robert T. Flaig, Holland, NY (US); Garick J. Tischler, Lakeview, NY (US)

(73) Assignee: Koike Aronson, Inc., Arcade, NY (US)

( * ) Notice: Subject to any disclaimer, the term of this patent is extended or adjusted under 35 U.S.C. 154(b) by 154 days.

(21) Appl. No.: 12/916,914

(22) Filed: Nov. 1, 2010

(65) Prior Publication Data
US 2012/0103947 A1   May 3, 2012

(51) Int. Cl.
*B23K 10/00* (2006.01)
(52) U.S. Cl. ......... 219/121.44; 219/121.39; 219/121.45; 219/121.48; 219/121.67
(58) Field of Classification Search ............. 219/121.39, 219/121.44, 121.45, 121.46, 121.48, 121.54, 219/121.59, 121.67, 124.21, 124.33, 137.37
See application file for complete search history.

(56) References Cited

U.S. PATENT DOCUMENTS

| 5,197,846 | A | * | 3/1993 | Uno et al. .................... 414/731 |
| 5,866,872 | A | * | 2/1999 | Lu et al. .................. 219/121.56 |
| 6,201,207 | B1 | | 3/2001 | Maruyama et al. |
| 6,392,190 | B1 | * | 5/2002 | Sue et al. ................. 219/121.59 |
| 7,074,112 | B2 | * | 7/2006 | Olsen ............................. 451/11 |
| 7,202,442 | B2 | * | 4/2007 | Nakagiri et al. ........... 219/137.9 |
| 8,010,224 | B2 | * | 8/2011 | Yamaguchi et al. .......... 700/173 |
| 2003/0000928 | A1 | | 1/2003 | Forlong |

FOREIGN PATENT DOCUMENTS

| EP | 1525940 A1 | 4/2005 |
| JP | 60-76276 A | 4/1985 |
| WO | 2008/128303 A1 | 10/2008 |

OTHER PUBLICATIONS

WIPO, Written Opinion of the International Search Authority (ISA/US) mailed Mar. 14, 2012 in International Application No. PCT/US2011/057660.
WIPO, International Search Report prepared by International Search Authority (ISA/US) mailed Mar. 14, 2012 in International Application No. PCT/US2011/057660.

* cited by examiner

*Primary Examiner* — Mark Paschall
(74) *Attorney, Agent, or Firm* — Hodgson Russ LLP

(57) ABSTRACT

A bevel head attachment comprises a rotation axis normal to a cutting plane and a rotary assembly having cylindrical inner and outer barrels and a bevel arm. The bevel arm carries a tilt arm having a torch clamp. The tilt arm rotates about a tilt axis forming an acute angle with the rotation axis. A rotation drive motor operable to rotate the bevel arm about the rotation axis and a tilt drive motor operable to rotate the tilt arm about the tilt axis are located remotely from the torch clamp. The tilt drive motor is connected to the tilt arm through the outer barrel. The motors are commanded according to only two transformation equations to rotate a torch held by the tilt arm about the rotation and tilt axes to achieve planer tilt adjustment. The lightweight attachment provides unlimited rotation, and locates sensitive electronic elements away from the torch.

16 Claims, 8 Drawing Sheets

BEVEL HEAD ATTACHMENT FOR PLASMA AND OXY FUEL CUTTING MACHINES

FIELD OF THE INVENTION

The invention relates generally to CNC machines for performing plasma arc cutting and/or oxy fuel cutting. The invention relates more particularly to an apparatus for positioning and tilting a cutting torch to perform a bevel cut.

BACKGROUND OF THE INVENTION

Plasma is an ionized gas that conducts electricity, and is created by adding energy, such as electricity, to an electrically neutral gas, such as compressed air. By adding electricity through an electrode (hafnium), the gas becomes imbalanced and conducts electricity. The more electrical energy added, the hotter the plasma arc becomes. Plasma arc cutting machines control this powerful energy by constricting the arc and forcing it through a cutting torch having a nozzle. By increasing air pressure and intensifying the arc with higher voltages, the arc becomes hotter and more capable of blasting through thicker metals and blowing away the cuttings. Plasma arc cutting systems require a power source, a plasma cutting torch, compressed gas, electrical power, and a supply of tips and electrodes. Plasma arc cutting machines can rapidly and precisely cut through any electrically conductive metal without preheating and with a minimal heat-affected zone. Plasma can cut metals such as aluminum, stainless steel, brass, and copper in excess of two inches thick, along with expanded and stacked metals.

In oxy fuel cutting, an oxygen/fuel gas flame preheats the metal to its ignition temperature, and a high-power oxygen jet is directed through a cutting torch at the metal creating a chemical reaction between the oxygen and the metal to form iron oxide, also known as slag. The high-power oxygen jet removes the slag from the kerf. Cut quality, preheating times, and thicknesses can be influenced by the type of fuel gas used. Oxy fuel cutting is used for ferrous, mild and low-alloy steels in thicknesses up to three feet or more. Oxy fuel cutting systems require a fuel tank, an oxygen tank, and a cutting torch. Oxy fuel cutting allows metalworkers to cut extremely thick metals with ease.

In order to form a beveled edge when cutting, the cutting torch must be tilted from a vertical orientation normal to the surface of the material (the cutting surface) to a tilted orientation oblique to the surface of the material. For this purpose, bevel head attachments capable of tilting a cutting torch have been used. Such bevel head attachments typically mount on a carriage of the cutting machine. In a common arrangement for CNC cutting machines, the carriage is adapted for travel side-to-side along a transverse gantry, and the gantry is adapted to move along a longitudinal direction of a cutting table. The bevel head attachment allows the tilt angle of the cutting torch to be controlled as the carriage is displaced relative to the material being cut to provide a beveled edge along the cut path. The bevel head attachment also enables the torch to be rotated about a vertical axis to orient the torch as specified by the cut program.

Where the torch is an oxy fuel cutting torch, it connects to hoses for supplying oxygen, and for preheating oxygen and fuel gas. Where the torch is a plasma cutting torch, it connects to hoses for supplying plasma gas, hoses for supplying and delivering cooling water, and cables for electricity. Thus, the bevel head attachment should accommodate various types of hoses and electrical cables connected to the torch in a manner that permits the torch to be tilted and rotated smoothly, even as the hoses and cables flex and twist.

It is also desirable that the bevel head attachment be as lightweight as possible so that it may be mounted on different cutting machines and carriages having different load capacities.

Many traditional bevel head attachments have rotational limitation and/or high maintenance costs and machine down time associated with wear of electrical slip rings for transmitting signals across rotational interfaces and other component failures due to proximity to the cutting operation.

U.S. Pat. No. 6,201,207 discloses a bevel head attachment of the prior art. The bevel head attachment uses a motorized three-dimensional parallelogram linkage for tilting a torch holder in which the torch is received. The linkage as a whole is rotatable by another motor about a vertical axis. The disclosed bevel head attachment is generally satisfactory, but is not as light as desired.

SUMMARY OF THE INVENTION

The present invention provides a bevel head attachment for mounting on a carriage of a cutting machine for controlling the tilt angle of a cutting torch relative to a cutting plane that is compact and lightweight, allows unrestricted head rotation, avoids the use of electronic slip rings, and locates sensitive electronic elements away from the cutting torch.

A bevel head attachment embodying the present invention comprises a rotation axis normal to the cutting plane, a cylindrical inner barrel and a cylindrical outer barrel coaxially aligned on the rotation axis and mounted such that the outer barrel is rotatable relative to the inner barrel about the rotation axis, a bevel arm rotatable relative to the inner and outer barrels about the rotation axis, and a tilt arm carried by the bevel arm. The tilt arm is mounted on the bevel arm for rotation about a tilt axis forming an acute angle with the rotation axis, and includes a torch clamp for receiving and holding a cutting torch. The bevel head attachment further comprises a rotation drive motor operable to rotate the bevel arm about the rotation axis and a tilt drive motor operable to rotate the tilt arm about the tilt axis. The tilt drive motor is connected to the tilt arm by way of the outer barrel.

In an embodiment of the invention, the tilt drive motor is operable to rotate the outer barrel about the rotation axis and is connected to the tilt arm further by way of a tilt timing pulley mounted on the outer barrel for rotation with the outer barrel about the rotation axis, a tilt drive pulley mounted on the outer barrel for rotation with the outer barrel about the rotation axis and spaced from the tilt timing pulley along the rotation axis, a first belt arranged between the tilt drive motor and the tilt timing pulley; and a second belt arranged between the tilt drive pulley and the tilt arm. A fixed tilt sensor and axially moving sensor ring are provided for detecting tilt limits. The sensor ring includes a plurality of following pins engaging a contoured surface of a cam coupled to the rotation timing pulley, such that a position of the sensor ring along the rotation axis changes in response to a relative rotation between the tilt timing pulley and the rotation timing pulley. The tilt sensor may be a proximity switch tripped by the sensor ring. A rotation sensor system for establishing a rotational home position of the timing pulleys includes a sensor target coupled to the tilt timing pulley for rotation with the tilt timing pulley and a sensor arranged at a fixed angular position about the rotation axis for cooperation with the sensor target. The rotation sensor may be a proximity switch tripped by the sensor target.

The rotation and tilt drive motors may be operated simultaneously according to motor commands calculated using only two transformation equations that are dependent upon the angular relationship between the tilt axis and the rotation axis. In this regard, the present invention encompasses a bevel head system including a programmed controller, and a method of controlling the tilt angle of a cutting torch relative to a cutting plane. The method generally comprises the steps of defining a rotation axis normal to the cutting plane, defining a tilt axis forming an acute angle with the rotation axis, and rotating the cutting torch about the rotation axis and about the tilt axis to achieve a desired tilt angle of the cutting torch such that the torch axis is coplanar with the rotation axis.

BRIEF DESCRIPTION OF THE DRAWINGS

The invention is described in detail below with reference to the following figures.

DETAILED DESCRIPTION OF THE INVENTION

Figure 1:
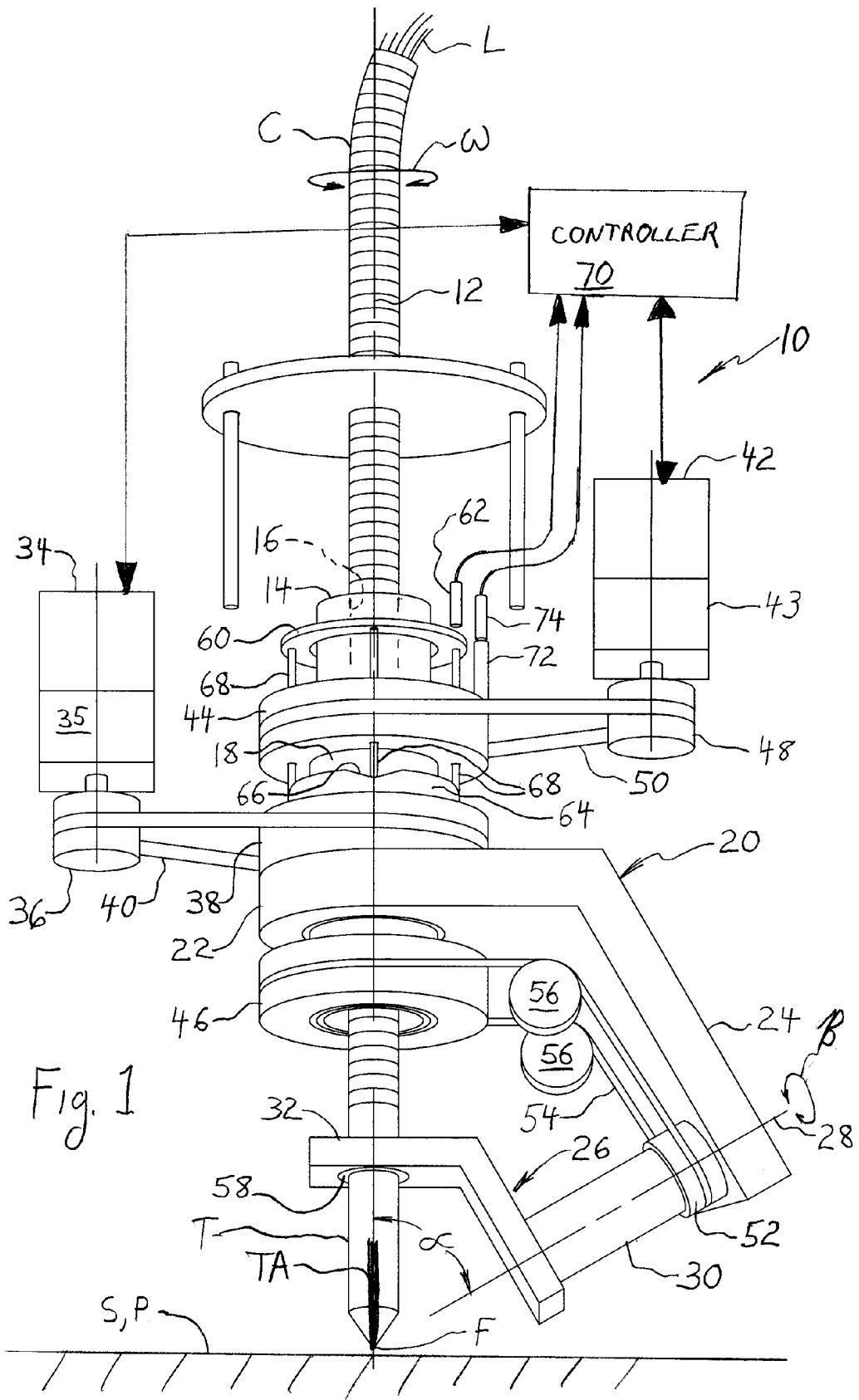
FIG. 1 is a generally schematic perspective view of a bevel head attachment formed in accordance with an embodiment of the present invention, wherein the attachment is shown connected to a controller located remotely from the attachment to form a bevel head system, and wherein the attachment is shown holding a cutting torch.

Reference is made initially to FIG. 1 of the drawings, wherein a bevel head attachment embodying the present invention is identified generally by the reference numeral 10. Bevel head attachment 10 is attachable to a carriage of a CNC cutting machine (not shown) of a type that uses a torch, for example a plasma arc cutting machine and/or an oxy fuel cutting machine. Bevel head attachment 10 receives a cutting torch T and is operable to tilt the cutting torch relative to surface S of the material to be cut (the work piece), rotate cutting torch T about a rotation axis 12 of the bevel head attachment extending normal to a cutting plane P which may coincide with surface S of the work piece, and to raise and lower cutting torch T (i.e. move the cutting torch away from and closer to cutting surface S). Cutting torch T includes a torch axis TA defining an orientation of the cutting torch.

Bevel head attachment 10 comprises a cylindrical inner barrel 14 having an axial passage 16 therethrough for receiving and guiding a torsionally rigid flexible conduit C through which plasma torch leads L are passed to cutting torch T. Inner barrel 14 is aligned on rotation axis 12 and is rotationally fixed relative to the supporting carriage mentioned above.

Bevel head attachment 10 also comprises a cylindrical outer barrel 18 coaxially arranged about inner barrel 14 and rotatable relative to inner barrel 14 about rotation axis 12. For example, an inner diameter surface of outer barrel 18 may be supported by rotary bearings (not shown) that are attached to an outer diameter surface of inner barrel 14. Cutting torch T, conduit C, and leads L are not part of bevel head attachment 10 of the present invention, but are received by and interact with bevel head attachment 10.

Bevel head attachment 10 further comprises a bevel arm 20 rotatable relative to inner barrel 14 and outer barrel 18 about rotation axis 12. Bevel arm 20 includes a sleeve portion 22 coaxially arranged about outer barrel 18 and an arm portion 24 extending axially from sleeve portion 22. As shown in FIG. 1, arm portion 24, or a segment thereof, may extend radially in addition to axially. To permit rotation of bevel arm 20 about rotation axis 12 independently of barrels 14 and 18, an inner diameter surface of sleeve portion 22 may be supported by rotary bearings (not shown) that are attached to an outer diameter surface of outer barrel 18.

Attachment 10 also comprises a tilt arm 26 carried by bevel arm 20. Tilt arm 26 is mounted on bevel arm 20 for rotation about a tilt axis 28 that is nonparallel to rotation axis 12. For example, tilt arm 26 may include a cylindrical axle 30 supported by one or more rotary bearings (not shown) mounted in arm portion 24 bevel arm 20 at a location axially spaced from sleeve portion 22. Tilt arm 26 includes a torch clamp 32 for receiving and holding a cutting torch T. Tilt axis 28 may intersect rotation axis 12 to form an acute angle α with the rotation axis.

A rotation drive motor 34 is provided as part of bevel head attachment 10 for driving rotation of bevel arm 20 about rotation axis 12. Rotation drive motor 34 may be connected to bevel arm 20 by a gearbox 35 mounted on rotation drive motor 34, an output pulley 36 associated with gearbox 35, a rotation timing pulley 38 mounted on bevel arm 20 for rotation with bevel arm 20 about rotation axis 12, and a non-slip belt 40 arranged to transmit rotational motion from output pulley 36 to timing pulley 38. Consequently, rotation drive motor 34 is operable to rotate bevel arm 20 about rotation axis 12. Rotation drive motor 34 may be bidirectional. As will be understood, the direction of rotation of rotation drive motor 34 determines the direction of rotation of bevel arm 20.

A tilt drive motor 42 is provided as part of bevel head attachment 10 for driving rotation of tilt arm 26 about tilt axis 28. Tilt drive motor 42 is connected to tilt arm 26 by way of outer barrel 18. In the embodiment shown in FIG. 1, a tilt timing pulley 44 and a tilt drive pulley 46 are rigidly mounted on outer barrel 18 for rotation with the outer barrel about rotation axis 12, and an output pulley 48 associated with a gearbox 43 mounted on tilt drive motor 42 is coupled to tilt timing pulley 44 by a non-slip belt 50. Thus, rotational motion from tilt drive motor 42 is transmitted though outer barrel 18 to tilt drive pulley 46. As shown in FIG. 1, sleeve portion 22 of bevel arm 20 may be arranged between tilt timing pulley 44 and tilt drive pulley 46. Tilt drive pulley 46 is operably connected to tilt arm 26. For example, tilt drive pulley 46 may be coupled by a non-slip belt 54 to a tilt arm pulley 52 coaxially and rigidly mounted on tilt arm axle 30, or formed integrally with tilt arm axle 30. One or more pairs of idler pulleys 56 may be provided on bevel arm 20 to directionally guide belt 54. Consequently, tilt drive motor 42 is operable to rotate tilt arm 26 about tilt axis 28. Tilt drive motor 42 may be bidirectional. The direction of rotation of tilt drive motor 42 determines the direction of rotation of tilt arm 26.

Cutting torch T may be supported in torch clamp 32 by one or more rotary bearings 58 allowing rotational motion between the cutting torch and tilt arm 26 about torch axis TA. This arrangement prevents torsional loading (twisting) of conduit C.

Bevel head attachment 10 may further comprise a tilt sensor system for detecting rotational limits about tilt axis 28. In the embodiment of FIG. 1, a tilt sensor system includes a tilt sensor ring 60, a tilt sensor 62, and a cam ring 64. Cam ring 64 is coupled to rotation timing pulley 38 for rotation with the rotation timing pulley about rotation axis 12 and has a contoured cam surface 66 facing sensor ring 60. Tilt sensor ring 60 includes a plurality of follower pins 68 extending parallel to rotation axis 12 and arranged to engage cam surface 66. Follower pins 68 may pass slidably through respective openings in tilt timing pulley 44. Due to elevation changes in cam surface 66 engaged by follower pins 68, the axial position of sensor ring 60 along rotation axis 12 changes in response to a relative rotation between tilt timing pulley 44 and rotation timing pulley 38 about rotation axis 12. Tilt sensor 62 is arranged at a fixed axial position along the rotation axis for cooperation with sensor ring 60. Tilt sensor 62 may be a proximity switch, for example an inductive proximity switch, connected to a CNC controller 70 described below. Cam surface 66 is configured such that sensor ring 60 moves close enough to tilt sensor 62 to trip the tilt sensor when a predetermined tilt angle limit is achieved, for example +/−45°, to stop the motors. Thus, tilt sensor 62 signals that a predetermined tilt angle limit has been reached. Tilt arm 26 may be "homed" (i.e. brought to a tilt home position such that the torch axis TA is aligned with rotation axis 12, as depicted for example in FIG. 1) by first activating tilt drive motor 42 until sensor ring 60 trips tilt sensor 62 at a predetermined rotational limit, and then commanding the tilt drive motor to rotate away from the rotational limit by the predetermined tilt angle limit so that the tilt angle is 0°. Tilt homing establishes a home position of tilt timing pulley 44 relative to rotation timing pulley 38.

The embodiment of FIG. 1 also illustrates a rotation sensor system for establishing a rotational home position of timing pulleys 38 and 44 relative to a fixed target on bevel head attachment 10. In the embodiment illustrated in FIG. 1, the rotation sensor system includes a rotation sensor target 72 coupled to tilt timing pulley 44 for rotation with the tilt timing pulley about rotation axis 12, and a rotation sensor 74 arranged at a fixed angular position about rotation axis 12 for cooperation with rotation sensor target 72. Rotation sensor 74 may be a proximity switch, for example an inductive proximity switch, connected to motor controller 70. Once the tilt homing has been carried out as described in the previous paragraph, rotation homing is carried out by simultaneously running both rotation drive motor 34 and tilt drive motor 42 such that rotation timing pulley 38 and tilt timing pulley 44 are rotated in unison until rotation sensor target 72 trips rotation sensor 74 at the rotation home position to stop the motors.

While not shown in FIG. 1, bevel head attachment 10 may be mounted on a carriage of a CNC cutting machine. The carriage may be adapted for travel side-to-side along a transverse gantry, and the gantry may be adapted for motion along a longitudinal direction of a cutting table of the cutting machine. Bevel head attachment 10 may include a lift drive assembly for raising and lowering a main support of attachment 10 relative to a mounting plate of attachment 10 adapted to be fixedly attached to the machine carriage. This structure is not shown in the schematic illustration of FIG. 1, but can be seen in FIG. 2 in connection with another embodiment.

Figure 1A:
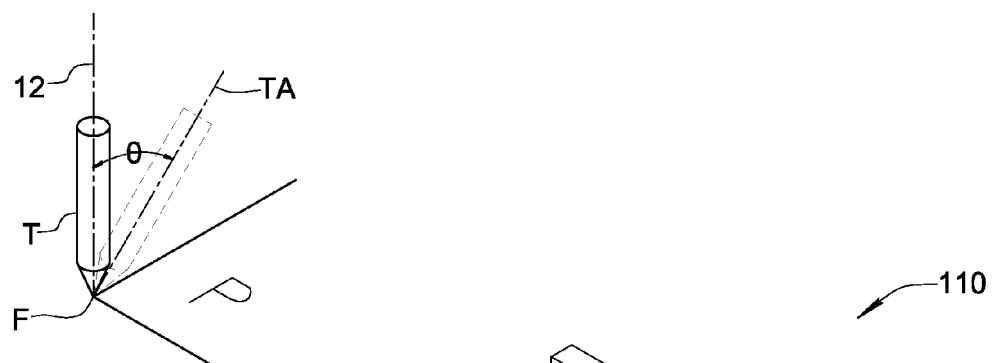
FIG. 1A is a schematic orthogonal diagram illustrating angle terminology associated with cutting torch T.

As represented schematically in FIG. 1, rotation drive motor 34 and tilt drive motor 42 are connected to CNC controller 70 for commanding operation of the rotation and tilt drive motors. Motor controller 70 is programmed by software instructions stored in an internal or external memory to calculate respective motor drive commands for rotation drive motor 34 and tilt drive motor 42 to achieve a desired tilt angle θ of the cutting torch. The desired tilt angle θ is specified in a cut program inputted to controller 70 by a user operating a user interface (not shown) or generated automatically from a CAD file by a third-party software application and loaded into controller 70. FIG. 1A schematically illustrates the tilt angle θ as it relates to rotation axis 12 and to cutting plane P normal to rotation axis 12. The motor drive commands are calculated such that the torch axis TA of the cutting torch is coplanar with rotation axis 12 at the specified tilt angle. In accordance with the present invention, motor controller 70 is programmed to calculate respective motor drive commands using only two transformation equations. The two transformation equations are dependent upon an angular relationship between tilt axis 28 and rotation axis 12, in particular the acute angle α between rotation axis 12 and tilt axis 28. The two transformation equations may be expressed as follows:

$$\beta = \text{Inv Cos}(((\text{Cos }\theta - 1 + (\text{Cos }\Phi)^2))/(\text{Cos }\Phi)^2)$$

$$\omega = \text{Inv Tan}((\text{Sin }\Phi - (\text{Sin }\Phi)^*\text{Cos }\beta))/\text{Sin }\beta)$$

where β is the commanded angle of rotation about tilt axis 28, ω is the commanded angle of rotation about rotation axis 12, θ is the desired tilt angle, and Φ is the compliment of acute angle α (i.e. Φ=90°−α). By way of non-limiting example, where the acute angle α formed by tilt axis 28 and rotation axis 12 is 60°, the transformation equations may be expressed as follows:

$$\beta = \text{Inv Cos}((\text{Cos }\theta - 0.25)/0.75)$$

$$\omega = \text{Inv Tan}((0.5 - (0.5^*\text{Cos }\beta))/\text{Sin }\beta)$$

The respective motor commands may be executed simultaneously to maintain torch axis TA coplanar with rotation axis 12 in a vertical plane as shown in FIG. 1A. These transformation equations described above, and the specified tilt angle θ, do not include gearbox and pulley ratios for each respective drive system. During rotation in the present embodiment, the relationship between the tilt and rotation timing pulleys is 1:1, but motor relationships may be different depending on gearbox and pulley ratios.

Advantageously, the present invention provides a configuration wherein tilt axis 28 intersects rotation axis 12 just below the tip of cutting torch T. This configuration enables the cutting torch to tilt and rotate about a constant tool point or focal point F using only two rotational axes. If tilt axis 28 was arranged perpendicular to rotation axis 12 and intersected rotation axis 12 just below the tip of cutting torch T, then tilt axle 30 and tilt arm 26 would interfere with the work piece. In prior art configurations, the tilt axis is arranged perpendicular to the rotation axis and located above the tip of the cutting torch, but this configuration causes the torch tip to translate relative to the work piece during tilting about the tilt axis. Such translation is unacceptable, and in order to eliminate the translation, additional transformation equations for the X, Y, and Z axis motions of the machine carriage are required. This involves more complicated software programming, and the accuracy of the bevel angle would be dependant upon the accuracies of five axes of motion instead of only two as provided by the present invention.

As may be appreciated, the present invention encompasses a method for controlling the tilt angle θ of a cutting torch T relative to a cutting plane comprising the steps of defining a rotation axis 12 normal to the cutting plane, defining a tilt axis 28 forming an acute angle α. with the rotation axis, and rotating the cutting torch T about rotation axis 12 and about tilt axis 28 to achieve a desired tilt angle of the cutting torch such that the torch axis TA is coplanar with the rotation axis. Motors 34 and 42 may be driven simultaneously according to the transformation equations taught above such that the cutting torch is rotated about the rotation axis and about the tilt axis simultaneously. This maintains torch axis TA coplanar with rotation axis 12 during adjustment of the tilt angle.

A bevel head attachment 110 formed in accordance with another embodiment of the present invention will now be described with reference to FIGS. 2-8. Attachment 110 closely corresponds to the schematically embodied attachment 10 of FIG. 1. Therefore, corresponding structure is identified by the same reference numerals used in FIG. 1. In FIGS. 2, 4, 5, 7, and 8, a front cover on arm portion 24 of bevel arm 20 is removed for clarity.

Bevel head attachment 110 comprises a vertical mounting plate 2 adapted to be fixedly mounted on a machine carriage (not shown) and a main support 4 projecting horizontally from mounting plate 2. Main support 4 is mounted on mounting plate 2 for vertical motion relative to the mounting plate along a pair of vertical guide rails 6 extending parallel to rotation axis 12. Bevel head attachment 110 comprises a bidirectional lift motor 11 fixed to main support 4 and commanded by controller 70 (FIG. 1), a gearbox 13 associated with lift motor 11, and a pinion gear 15 arranged to mesh with a vertical toothed rack 17 fixed to mounting plate 2. Pinion gear 15 is driven by lift motor 11 acting through gearbox 13 to move upward or downward along rack 17 depending upon the direction of rotation. The range of vertical travel of support arm 4 may be defined by upper and lower limit switches 19 arranged near one of the guide rails 6 for engagement by a limit tab 21 provided on main support 4, whereby lift motor 11 may be deactivated if either limit switch 19 is tripped.

Inner barrel 14 is fixed to main support 4 by fasteners 23. As best seen in the sectional view of FIG. 8, outer barrel 18 is rotatably supported about inner barrel 14 by rotary bearings 25 that are attached to an outer diameter surface of inner barrel 14. Another set of rotary bearings 27 attached to an outer diameter surface of outer barrel 18 support sleeve portion 22 of bevel arm 20 such that bevel arm 20 is independently rotatable relative to inner barrel 14 and outer barrel 18 about rotation axis 12. Arm portion 24 of bevel arm 20 extends axially from sleeve portion 22, with a lower segment of arm portion 24 being angled to extend radially in addition to axially. Rotation timing pulley 38 is fixed to bevel arm 20 for rotation with bevel arm 20 about rotation axis 12, and cam ring 64 is fixedly nested within rotation timing pulley 38 to rotate therewith. Inner and outer bearing retainers 29 and 31 are secured to an underside of sleeve portion 22. Axle 30 of tilt arm 26 is rotatably supported in the angled lower segment of arm portion 24 on bevel arm 20 by rotary bearings (not shown) carried in a journal passage 33 to allow rotation of tilt arm 26 about tilt axis 28 relative to arm portion 24. In the embodiment depicted in FIGS. 2-8, tilt axis 28 intersects rotation axis 12 to form an acute angle of 60° with the rotation axis.

Figure 2:
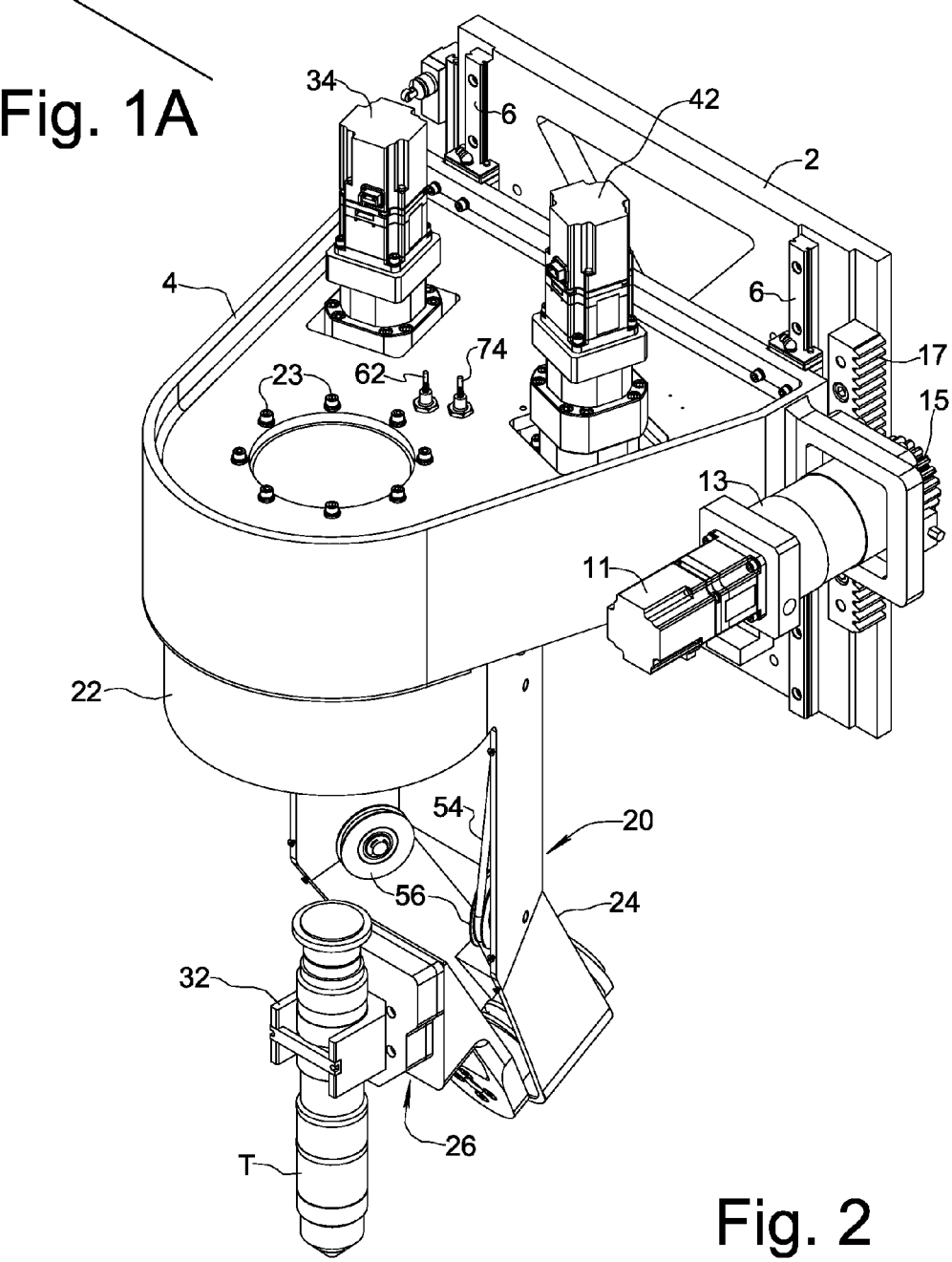
FIG. 2 is a perspective view of a bevel head attachment formed in accordance with another embodiment of the present invention, wherein the attachment is shown holding a cutting torch.
Figure 3:
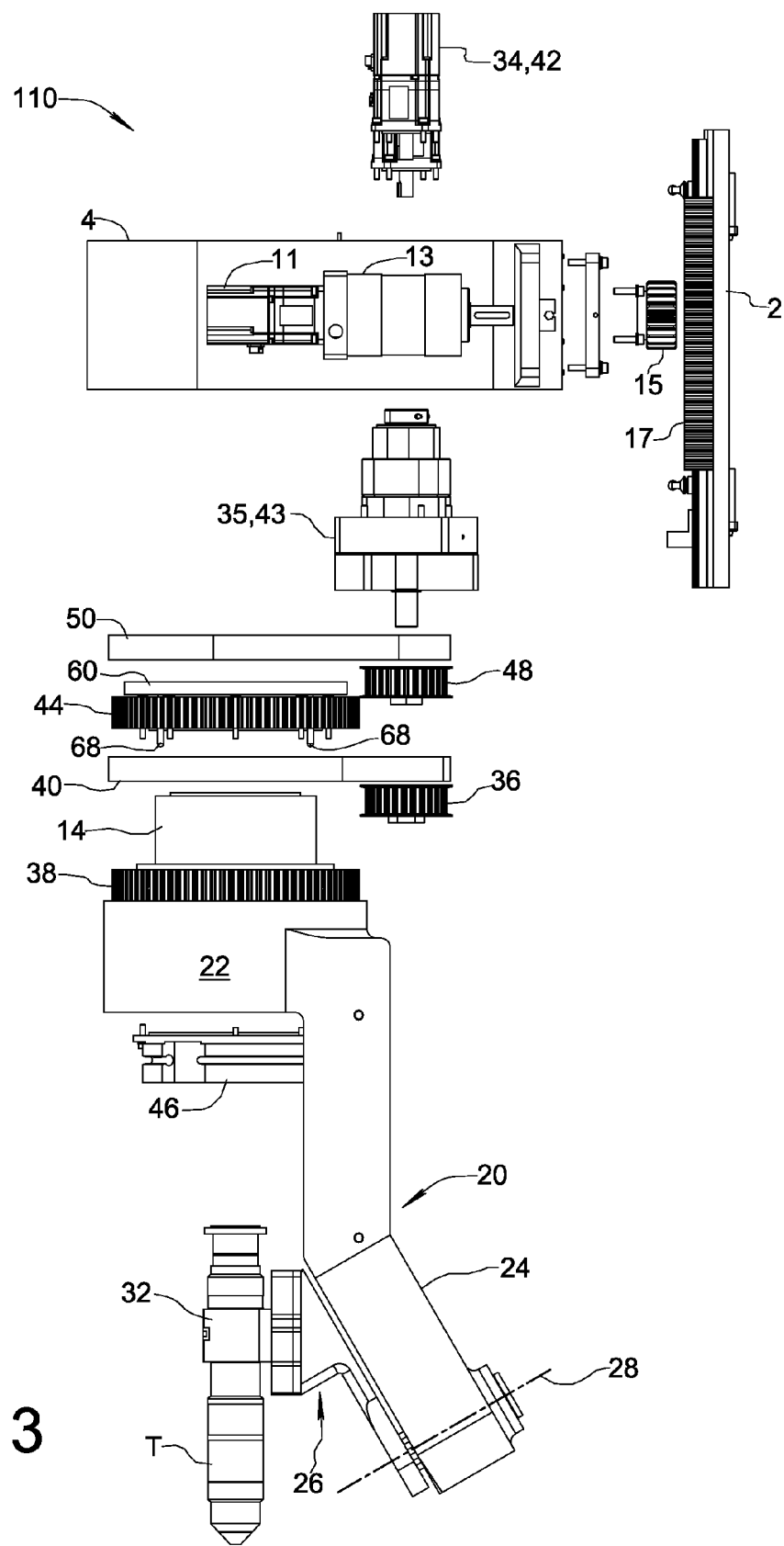
FIG. 3 is an exploded side view of the bevel head attachment and cutting torch shown in FIG. 2.
Figure 4:
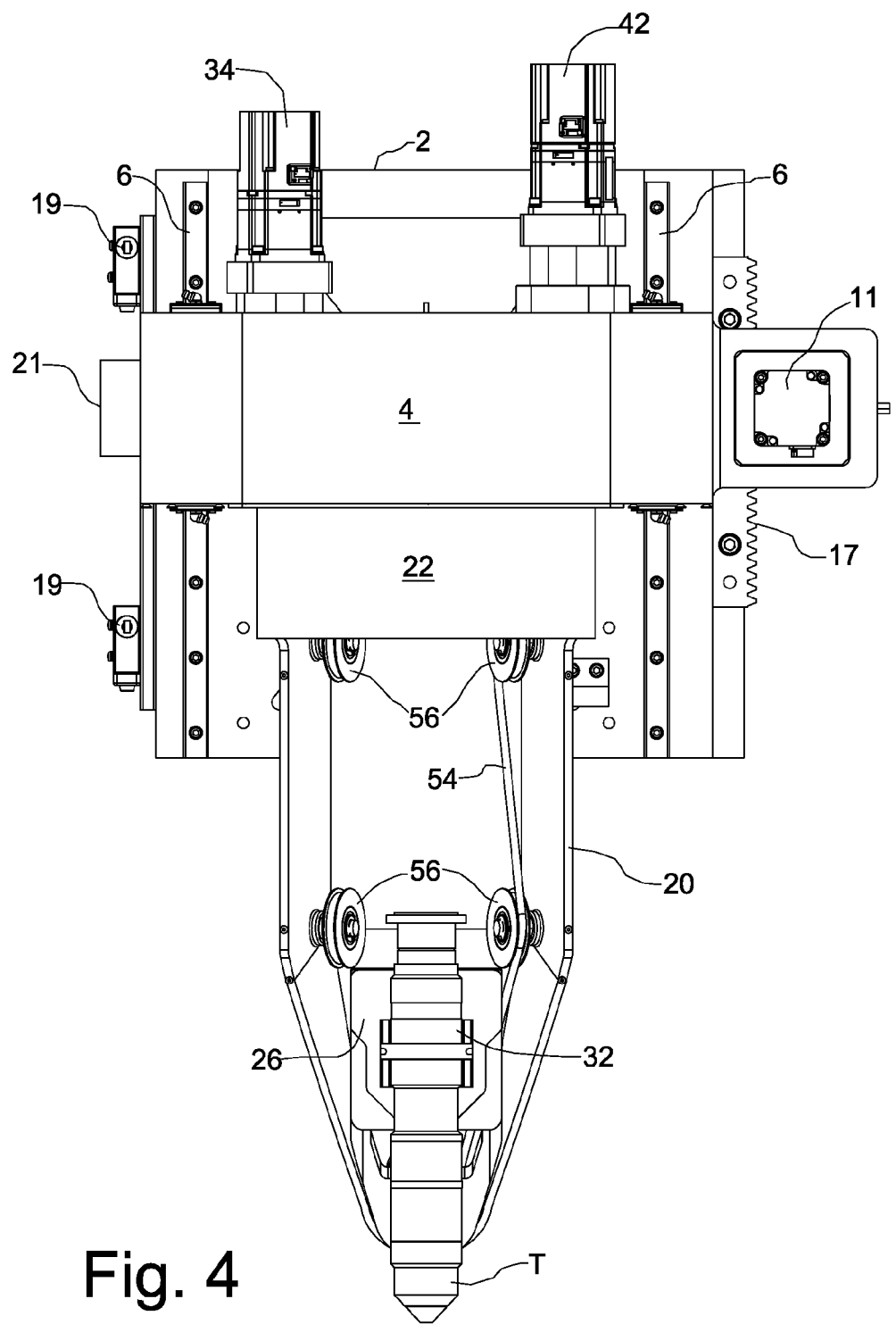
FIG. 4 is a front elevational view of the bevel head attachment and cutting torch shown in FIG. 2.
Figure 5:
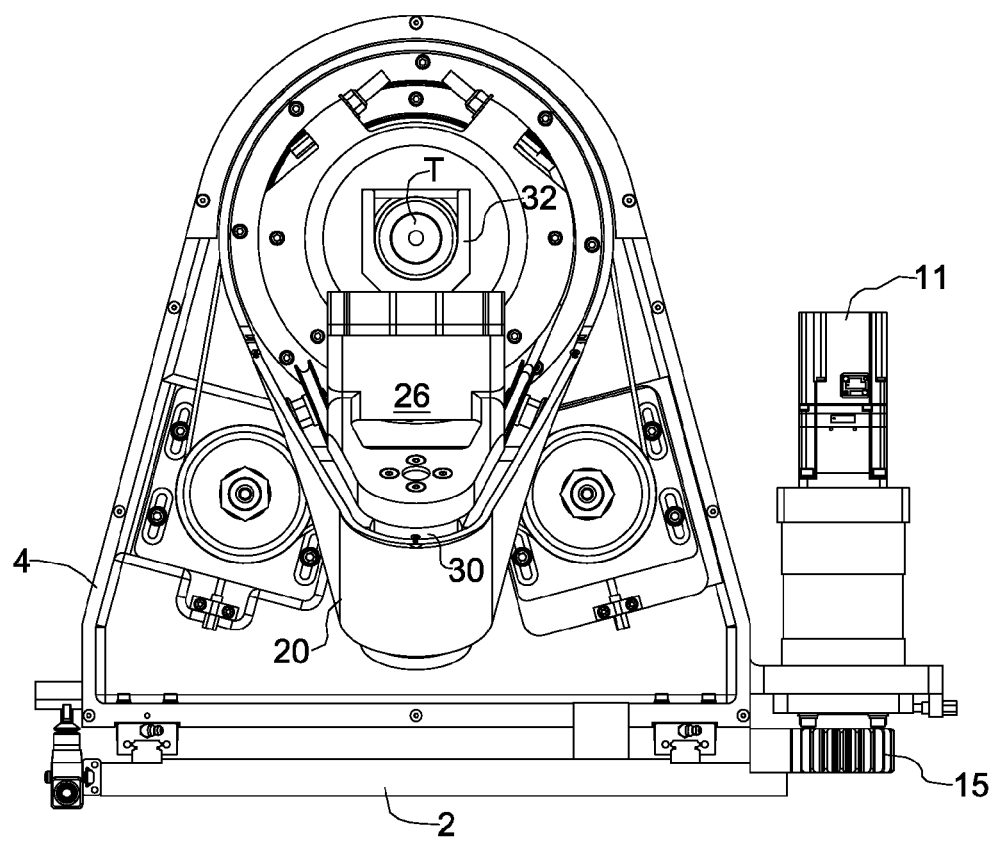
FIG. 5 is a bottom plan view of the bevel head attachment and cutting torch shown in FIG. 2.
Figure 6:
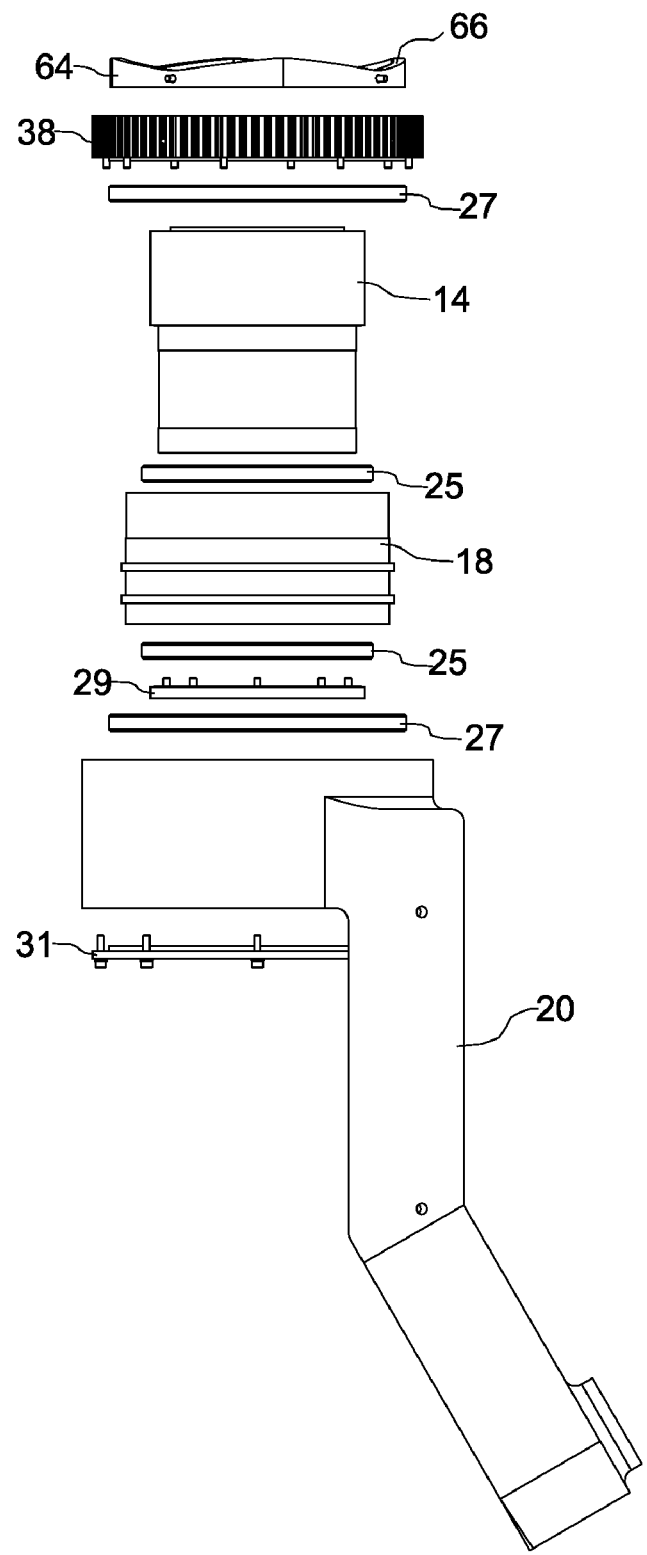
FIG. 6 is an exploded side view showing elements of a rotating assembly of the bevel head attachment shown in FIG. 2.
Figure 7:
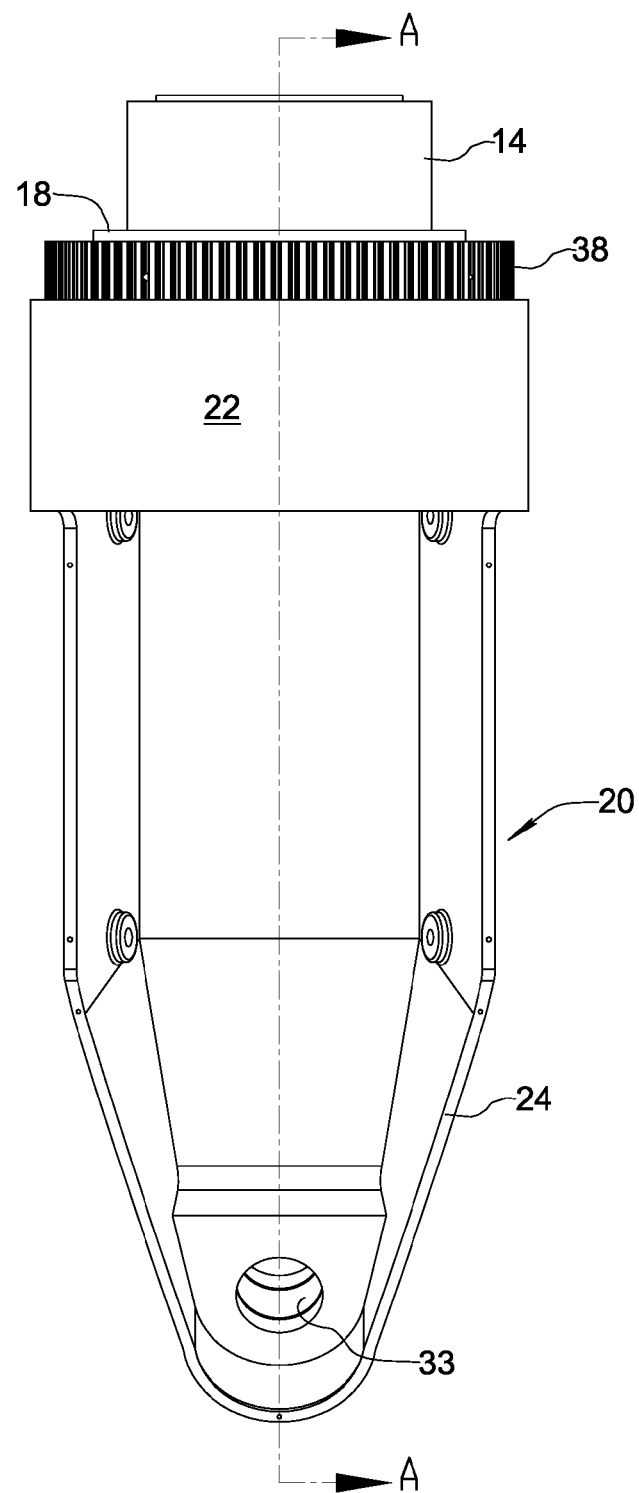
FIG. 7 is a front elevational view of the rotating assembly shown in FIG. 6.
Figure 8:
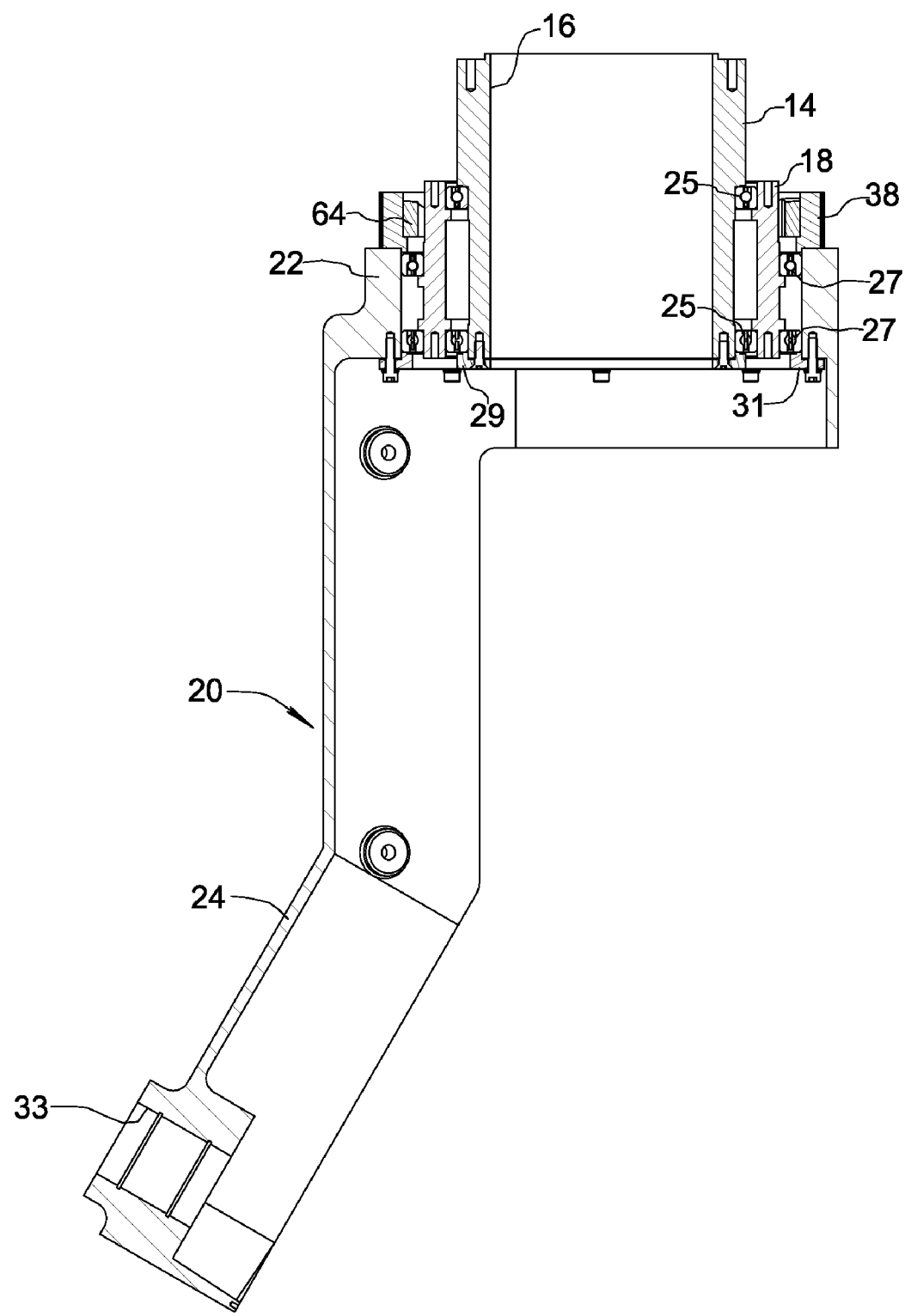
FIG. 8 is a sectional view of the of the rotating assembly taken generally along the line A-A in FIG. 7.

Rotation drive motor 34 and tilt drive motor 42, and their associated gearboxes 35 and 43, may be mounted vertically on main support 4 as shown in FIG. 2 such that the drive motors are above main support 4, safely away and protected from cutting torch T. Drive motors 11, 34, and 42 may be servo motors for accurate motion control. In the present embodiment, rotation timing pulley 38 and tilt timing pulley 44 take the form of toothed pulleys, and associated non-slip belts 40 and 50 take the form of flexible toothed belts. Tilt drive pulley 46 is fastened to a bottom end of outer barrel 18, and is embodied as a cable pulley. In corresponding fashion, non-slip belt 54 is in the form of a cable having positive drive characteristics. As used herein, the term "belt" is to be construed broadly to include flexible transmission elements whether flat or round in cross-section, toothed or smooth, and endless (closed loop) or not endless. Two pairs of idler pulleys 56 are mounted on arm portion 24 of bevel arm 20 to guide transmission belt 54.

Importantly, tilt sensor 62 and rotation sensor 74 may be located on main support 4 remote from cutting torch T. For example, in FIG. 2, tilt sensor 62 and rotation sensor 74 are each embodied as a proximity switch mounted on main support 4 such that a portion of the switch extends visibly above main support 4. In the described arrangement, sensors 62 and 74 are protected from the cutting torch T during operation.

Components of bevel head attachment 110, such as mounting plate 2, main support 4, inner barrel 14, outer barrel 18, bevel arm 20, tilt arm 26, and others, may be manufactured from a strong, lightweight material, for example aluminum. Bevel head attachment 110 embodies a lighter weight, more compact design, thereby making it suitable for use with a variety of torch cutting machines, even those having a relatively low weight capacity for mounted tooling attachments.

The present invention provides a bevel head attachment having unlimited head rotation about rotation axis 12 without the use of electrical slip rings, while providing remote mounting of servo motors and sensor components at a safe distance from the cutting torch.

What is claimed is:

1. A bevel head attachment for mounting on a carriage of a cutting machine for controlling the tilt angle of a cutting torch relative to a cutting plane, the bevel head attachment comprising:
    a rotation axis normal to the cutting plane;
    a cylindrical inner barrel having an axial passage therethrough, the inner barrel being aligned on the rotation axis;
    a cylindrical outer barrel coaxially arranged about the inner barrel and rotatable relative to the inner barrel about the rotation axis;
    a bevel arm rotatable relative to the inner and outer barrels about the rotation axis;
    a tilt arm carried by the bevel arm, the tilt arm being mounted on the bevel arm for rotation about a tilt axis forming an acute angle with the rotation axis, the tilt arm including a torch clamp for receiving and holding a cutting torch;
    a rotation drive motor connected to the bevel arm, the rotation drive motor being operable to rotate the bevel arm about the rotation axis; and
    a tilt drive motor connected to the tilt arm by way of the outer barrel, the tilt drive motor being operable to rotate the tilt arm about the tilt axis.

2. The attachment according to claim 1, wherein the tilt drive motor is operable to rotate the outer barrel about the rotation axis.

3. The attachment according to claim 2, wherein the tilt drive motor is connected to the tilt arm further by way of a tilt timing pulley mounted on the outer barrel for rotation with the outer barrel about the rotation axis, a tilt drive pulley mounted on the outer barrel for rotation with the outer barrel about the rotation axis and spaced from the tilt timing pulley along the rotation axis, a first belt arranged between the tilt drive motor and the tilt timing pulley, and a second belt arranged between the tilt drive pulley and the tilt arm.

4. The attachment according to claim 3, wherein the bevel arm includes a sleeve portion arranged about the outer barrel between the tilt timing pulley and the tilt drive pulley and an arm portion extending from the sleeve portion.

5. The attachment according to claim 3, further comprising a pair of idler pulleys supported by the bevel arm and engaged by the second belt.

6. The attachment according to claim 3, further comprising:
   a sensor ring, wherein a position of the sensor ring along the rotation axis changes in response to a relative rotation between the tilt timing pulley and the rotation timing pulley about the rotation axis; and
   a sensor arranged at a fixed position along the rotation axis for cooperation with the sensor ring.

7. The attachment according to claim 6, wherein a cam ring is coupled to the rotation timing pulley for rotation with the rotation timing pulley about the rotation axis, the cam ring having a cam surface, and the sensor ring includes a plurality of follower pins extending parallel to the rotation axis and arranged to engage the cam surface of the cam ring for changing the position of the sensor ring along the rotation axis.

8. The attachment according to claim 7, wherein the plurality of follower pins pass slidably through respective openings in the tilt timing pulley.

9. The attachment according to claim 6, wherein the sensor includes a proximity switch.

10. The attachment according to claim 3, further comprising:
    a sensor target coupled to the tilt timing pulley for rotation with the tilt timing pulley about the rotation axis; and
    a sensor arranged at a fixed angular position about the rotation axis for cooperation with the sensor target.

11. The attachment according to claim 10, wherein the sensor includes a proximity switch.

12. The attachment according to claim 1, further comprising a vertical mounting plate adapted for attachment to a carriage of a cutting machine and a main support projecting horizontally from the mounting plate, wherein the torch clamp is located remote from and below the main support, and the rotation drive motor and tilt drive motor are located above the main support.

13. The attachment according to claim 6, further comprising a vertical mounting plate adapted for attachment to a carriage of a cutting machine and a main support projecting horizontally from the mounting plate, wherein the torch clamp is located remote from and below the main support, and the sensor is located on or in the main support.

14. The attachment according to claim 10, further comprising a vertical mounting plate adapted for attachment to a carriage of a cutting machine and a main support projecting horizontally from the mounting plate, wherein the torch clamp is located remote from and below the main support, and the sensor is located on or in the main support.

15. A bevel head system for controlling the tilt angle of a cutting torch relative to a cutting plane, the cutting torch having a torch axis, wherein the bevel head system comprises:
    a rotation axis normal to the cutting plane;
    a bevel arm rotatable about the rotation axis;
    a tilt arm carried by the bevel arm, the tilt arm being mounted on the bevel arm for rotation about a tilt axis forming an acute angle with the rotation axis, the tilt arm including a torch clamp for receiving and holding a cutting torch, the torch clamp having a normal position wherein a cutting torch held by the torch clamp is aligned with the rotation axis;
    a rotation drive motor connected to the bevel arm, the rotation drive motor being operable to rotate the bevel arm about the rotation axis;
    a tilt drive motor connected to the tilt arm, the tilt drive motor being operable to rotate the tilt arm about the tilt axis; and
    a motor controller for commanding operation of the rotation drive motor and the tilt drive motor, wherein the motor controller is programmed to calculate respective motor drive commands for the rotation drive motor and the tilt drive motor to achieve a desired tilt angle of the cutting torch such that the torch axis of the cutting torch is coplanar with the rotation axis.

16. The system according to claim 15, wherein the motor controller is programmed to calculate the respective motor drive commands using only two transformation equations, the two transformation equations being dependent upon an angular relationship between the tilt axis and the rotation axis.

* * * * *